US005967526A

United States Patent [19]

Oen et al.

[11] Patent Number: 5,967,526

[45] Date of Patent: *Oct. 19, 1999

[54] FLUID CONTROL SYSTEM FOR ROTATING SHAFT OR FLYWHEEL

[75] Inventors: Richard J. Oen, Wapakoneta; Edward A. Daniel, Fort Loramie, both of Ohio

[73] Assignee: The Minster Machine, Minster, Ohio

[ * ] Notice: This patent is subject to a terminal disclaimer.

[21] Appl. No.: 08/792,775

[22] Filed: Feb. 3, 1997

Related U.S. Application Data

[62] Division of application No. 08/583,756, Jan. 11, 1996, Pat. No. 5,028,248.

[51] Int. Cl.[6] .................................................. F16J 15/54

[52] U.S. Cl. ........................................ 277/423; 277/429

[58] Field of Search ................................ 277/411, 429, 277/430, 585, 301, 423, 409

[56] References Cited

U.S. PATENT DOCUMENTS

| | | | |
|---|---|---|---|
| 4,427,202 | 1/1984 | Backlin | 277/68 |
| 4,945,724 | 8/1990 | O'Neal | 60/455 |

*Primary Examiner*—Chuck Y. Mah
*Assistant Examiner*—Alison K. Pickard
*Attorney, Agent, or Firm*—Randall J. Knuth

[57] ABSTRACT

A fluid control system for a rotating shaft which provides a seal to limit fluid leakage from around the shaft and which vacuums away any fluid leaking past the provided seal. The fluid control system may be installed around a rotating shaft such as a flywheel in a press. The fluid control system includes a housing which forms a clearance space with the rotating shaft in which fluid, such as oil being used to create or service the flywheel bearing, can be collected. A seal is provided between the rotating shaft and the housing to prevent fluid leakage from the clearance space. A vacuum mechanism positioned along a leakage path beyond the seal is provided with an air duct through which passes a vacuum induced air flow which vacuums away fluid leaked from the seal. The air duct is preferably configured to include a radial clearance between a portion of the fluid collection system and the rotating shaft such that relative axial movement therebetween does not compromise the vacuuming capabilities of the vacuum mechanism, and therefore the fluid collection system can be employed with axially reciprocating or moving rotating shafts.

2 Claims, 5 Drawing Sheets

FLUID CONTROL SYSTEM FOR ROTATING SHAFT OR FLYWHEEL

This is a division of application Ser. No. 08/583,756, filed Jan. 11, 1996, now U.S. Pat. No. 5,028,248.

BACKGROUND OF THE INVENTION

The present invention pertains to a fluid control system, and, in particular, to a system for controlling oil or other lubricating liquid fluid leakage on a rotating shaft or flywheel in a device such as a mechanical press. The shaft or flywheel may also be subjected to axial movement.

Mechanical presses, such as straight side presses and gap frame presses for stamping and drawing, generally include a frame having a crown and bed and a slide supported within the frame for reciprocating motion toward and away from the bed. The slide is typically driven by a crankshaft having a connecting arm connected to the slide, to which is mounted the upper die. Rotation of the crankshaft moves the connecting rods to effect straight reciprocating motion of the slide. The lower die is conventionally mounted to a bolster which, in turn, is connected to the bed. Such mechanical presses are widely used for blanking and drawing operations and vary substantially in size and available tonnage depending on their intended use.

The primary apparatus for storing mechanical energy in a press is the flywheel. The flywheel and flywheel bearing are normally axially mounted on either the driveshaft, crankshaft, or the press frame by use of a quill. The flywheel is typically mounted at one end of the crankshaft and connected by a belt to the output pulley of a motor such that when the motor is energized, the massive flywheel rotates continuously. The motor replenishes the energy that is lost or transferred from the flywheel during press operations. When the clutch engages the flywheel to transmit rotary motion of the flywheel to the crankshaft, the flywheel drops in speed as the press driven parts are brought up to press running speed.

During clutch engagement, dry and clean clutch linings free from oils or lubricants are necessary to reduce the time necessary to bring the driven parts up to press running speed, and lower times translate to fewer bad parts being produced by the press. Clean, dry brake linings are also necessary for reduced stopping time, and lower stopping times similarly result in fewer unacceptable parts being produced. Also, containing oil or lubricant spillage from leaking flywheel bearings is desirable to keep the local environment clean.

When a flywheel is mounted on a quill journal, seals and various O-rings have typically been placed throughout the quill journal area to reduce the likelihood of oil and lubricant present at the flywheel bearings from migrating to the clutch and brake lining areas. These types of oil control means are passive is and work only so long as the seals and O-rings maintain their integrity. External factors such as seal damage due to installation, contamination, corrosion, or seal compression set may degrade the ability of the seals or O-rings to retain oil. Ultimately a leak may occur which wets the clutch or brake linings and thereby results in inefficient operation of the press.

In a variety of sealing devices known in the art, vacuum pressures have been employed to aid in removing oil which has passed by the seals. For example, in a prior art press disclosed in U.S. Pat. No. 5,467,705, a drain port connected to a vacuum source is used to vacuum oil from around a non-rotating, reciprocating shaft that has leaked past a shaft seal.

In particular, vacuuming oil from certain portions of rotating shafts is assisted by the rotation of the shaft. Centrifugal forces associated with shaft rotation tend to fling oil from those shaft surfaces which are axially aligned, and consequently a radially aligned vacuum port may function satisfactorily. However, vacuuming away fluids present on the ends of the shafts, for example on the side of a flywheel, may be complicated if the centrifugal forces tend to throw the fluid past a conventionally mounted vacuum inlet.

Another difficulty with using vacuum pressures to induce an air flow to vacuum fluid off the radially extending surface of a flywheel is that selected clearances should be held to optimize the air flow. Variations in the relative positions of the vacuum housing and flywheel can result in an air flow inadequate to vacuum off the fluid. However, as a slight play in the flywheel mounting may be possible, or the flywheel may be designed to axially shift during its operation, as disclosed in co-pending application Ser. No. 08/537,996, it would be desirable for fluid control systems using vacuum pressures to account for this axial movement.

Thus, it would be desirable to provide a mechanical press having a fluid control system for a rotating component which overcomes the shortcomings described above.

SUMMARY OF THE INVENTION

The present invention provides an oil control system for a press which vacuums fluid such as oil from leaking seals and O-rings mounted about the flywheel. The present invention further allows removal of oil or lubricants from rotating parts that are also reciprocating or experiencing axial motion.

In one form thereof, the present invention provides a press including a frame structure with a crown and a bed, a slide guided by the frame structure for reciprocating movement in opposed relation to the bed, a drive mechanism attached to the frame structure, a flywheel assembly rotatably driven by the drive mechanism, wherein the flywheel assembly includes a flywheel rotatable relative to the frame structure about an axis of rotation on at least one bearing, a crankshaft rotatably disposed within the crown and in driving connection with the slide, a clutch assembly for selectively connecting the flywheel to the crankshaft for driving rotation thereof, and a fluid control system for controlling fluid associated with the bearing. The fluid control system comprises a housing defining a clearance space with the flywheel assembly, wherein the clearance space is arranged in flow communication with the bearing to collect fluid therefrom, a seal for limiting leakage of fluid from the clearance space, and vacuum means including vacuum drain port arranged for removing fluid leaking past the seal. The vacuum means includes an air duct structured and arranged to draw a flow of air suitable to provide a vacuum induced air flow through the vacuum drain port during vacuum operation sufficient to vacuum away fluid leaking past the seal means.

In another form thereof, the present invention provides the combination of a shaft assembly and a fluid control system for controlling fluid associated with a bearing of the shaft assembly. The shaft assembly includes a rotatable component rotatably mounted to a support member by a bearing, and the rotatable component includes an annular recess on a surface disposed generally transverse to the shaft assembly axis of rotation. The fluid control system includes a housing forming a clearance space with the shaft assembly that is arranged in flow communication with the bearing to collect fluid therefrom, a seal arranged to limit leakage of fluid from the clearance space, a vacuum housing including at least one vacuum drain port connected to a vacuum source and arranged for removing fluid leaking past the seal, wherein the vacuum housing includes an axial projection which projects within the annular recess, at least one vacuum conduit in communication with the vacuum drain port and opening into a vacuuming space between the axial projection and the recess surface for vacuuming fluid therefrom, and an air duct structured and arranged to draw a flow of air suitable to provide a vacuum induced air flow through the vacuuming space and the vacuum drain port during vacuum operation sufficient to vacuum away fluid leaking past the seal.

In another form thereof, the present invention provides the combination of a shaft assembly and a fluid control system. A rotatable component of the shaft assembly is rotatably mounted to a support member by at least one bearing. The fluid control system for controlling fluid associated with the bearing includes a fluid slinger mounted for rotation with the rotatable component, a housing forming a clearance space with the shaft assembly, wherein the clearance space is arranged in flow communication with the bearing to collect fluid therefrom, a seal arranged to limit leakage of fluid from the clearance space, and a vacuum housing which the rotatable component rotates relative to and which includes at least one vacuum drain port connected to a vacuum source and arranged for removing fluid leaking past the seal. The vacuum housing further includes a recess into which the fluid slinger projects and in communication with the vacuum drain port, and the fluid slinger is positioned along a fluid leak path between the seal and the vacuum drain port, whereby fluid leaking past the seal is slung into the recess by the fluid slinger. The fluid collection system also includes an air duct structured and arranged to draw a flow of air suitable to provide a vacuum induced air flow through the vacuum drain port during vacuum operation sufficient to vacuum away fluid leaked past the seal.

One advantage of the present invention is that a fluid control system is provided which vacuums away the oil leaking past a seal circumferentially extending around a rotating shaft.

Another advantage of the present invention is that a mechanical press is provided having a fluid control system for a flywheel that prevents the clutch linings and brake linings from being wetted with lubricants in a manner which would compromise the operation of the press.

Yet another advantage of the present invention is to control spillage from flywheel bearings to avoid environmental contamination.

Still another advantage of the present invention is that the fluid control system can be configured to vacuum fluid or oil which escapes past a seal or O-ring on a part that is both axially reciprocating and rotating.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
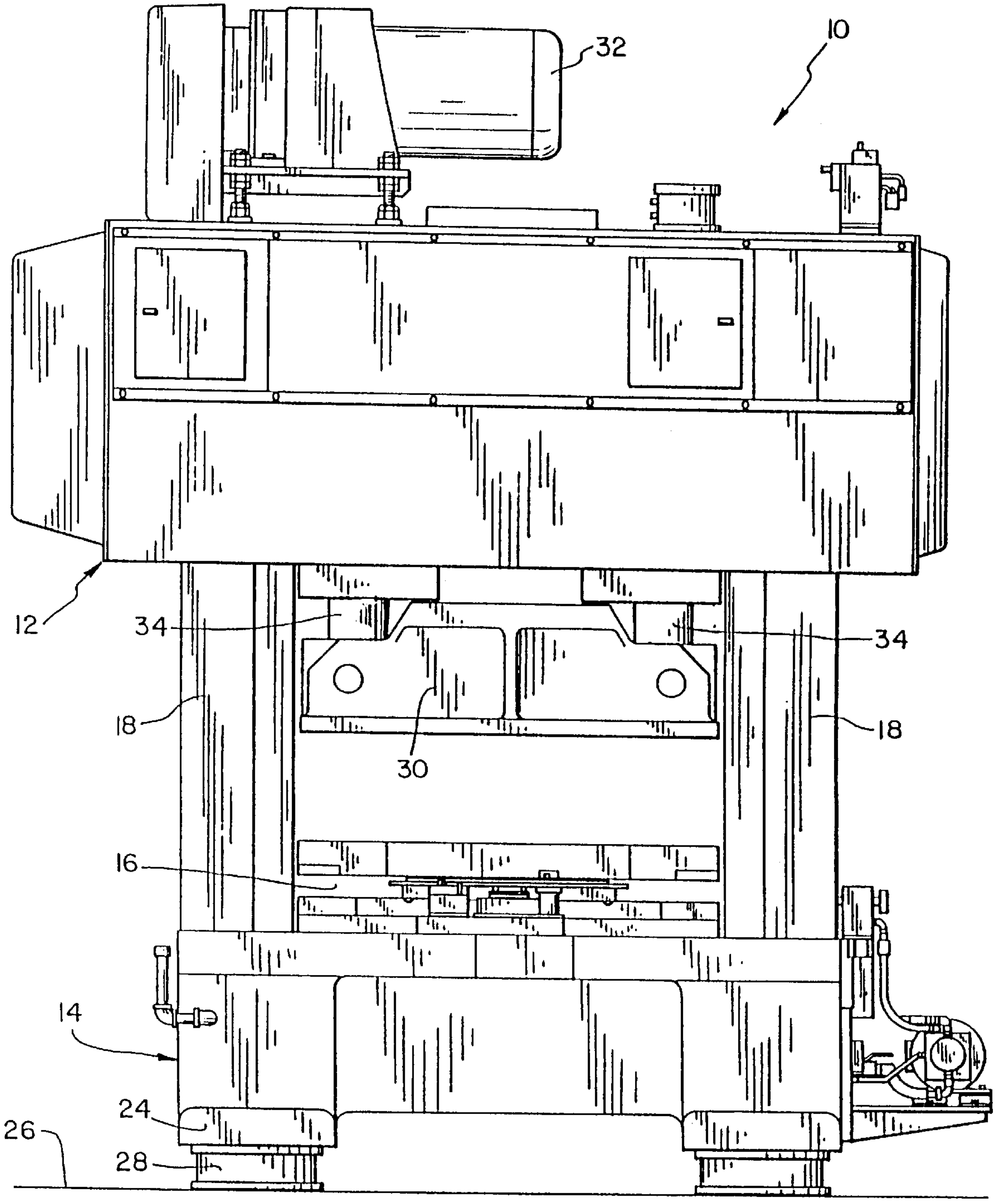
FIG. 1 is an elevational front view of one configuration of a mechanical press incorporating the present invention in one form thereof.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

Referring now to FIG. 1, there is shown one embodiment of a mechanical press, generally designated 10, which employs the teachings of the present invention. As is conventional, press 10 includes a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 30 is positioned between uprights 18 for rectilinear, reciprocating movement. Tie rods (not shown), extending through crown 12, uprights 18 and bed portion 14, are attached at each end with tie rod nuts. Leg members 24 are formed as an extension of bed 14 and are generally mounted on shop floor 26 by means of shock absorbing pads 28. A drive mechanism for the press is shown as including a drive motor 32 connected by means of a belt (not shown) to flywheel 42 and clutch (not shown) to power the rotation of the press crankshaft 40 (FIG. 2) to which connecting rods 34 are attached.

It will be appreciated in view of the following that the above description of the press and its drive mechanism is merely illustrative and is not intended to be limiting, as those of skill in the art will recognize that other known press and drive configurations can advantageously utilize the teachings of the present invention. Furthermore, while the fluid control system is described herein as being incorporated into a mechanical press, it is possible to adapt the fluid control system to any of a variety of rotating components that are also subjected to axial movement for which containment of the migration of fluids, for example lubricants or coolants, present around the rotating and reciprocating components is desired.

Figure 2:
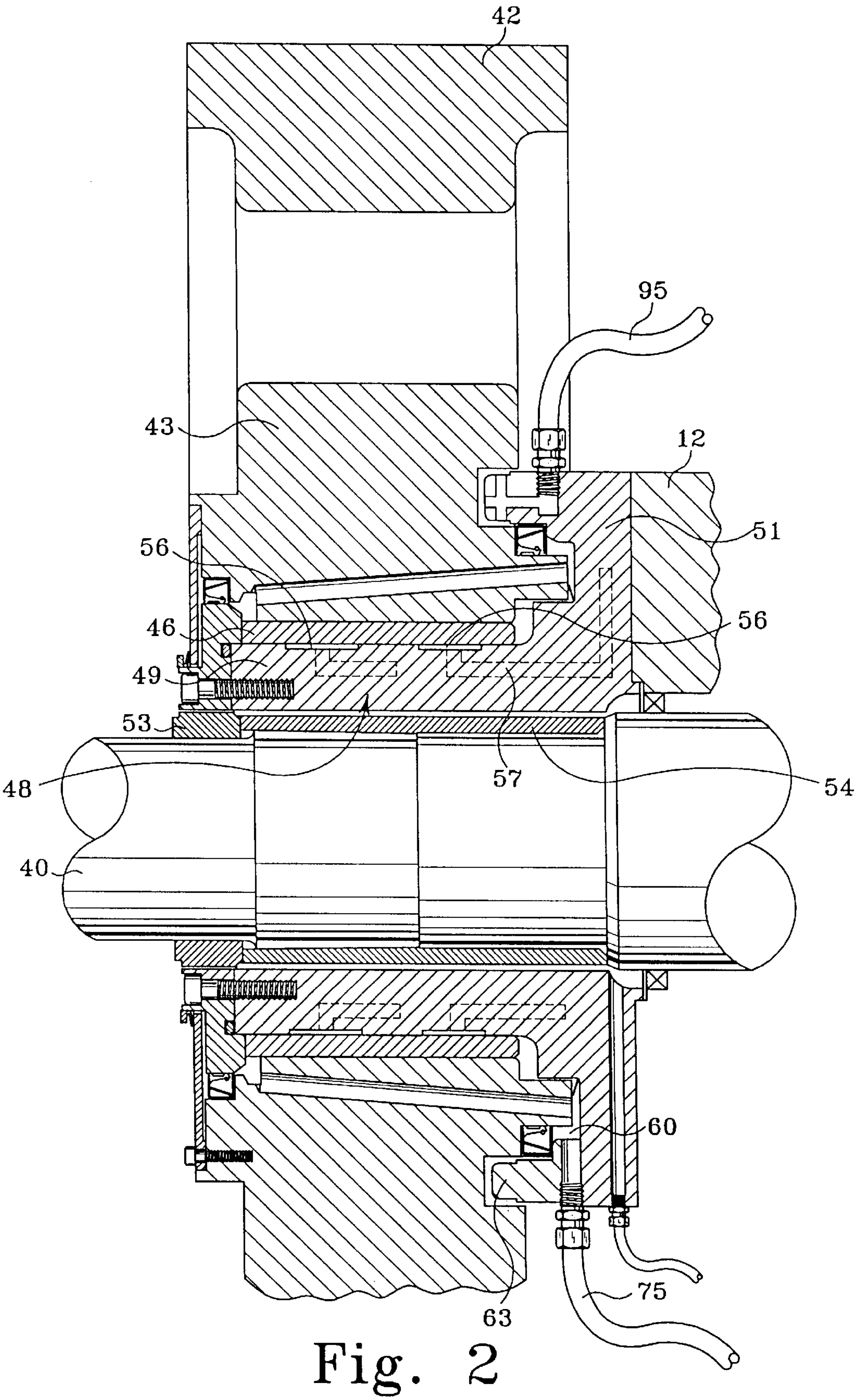
FIG. 2 is a fragmentary, vertical sectional view of the mechanical press of FIG. 1 illustrating one possible arrangement of the flywheel assembly and press crankshaft along with one form of the fluid control system of the present invention.

Referring now to FIG. 2, there is shown a fragmentary, cross-sectional side view of the press of FIG. 1. Press crankshaft 40 is rotatably supported within crown portion 12 and extends in an axial direction. As is conventional, the portion (not shown) of crankshaft 40 further inward or to the right in FIG. 2 is connected to slide 30 by connecting rods to cause rotational energy of crankshaft 40 to be converted into reciprocating movement of slide 30. The combination clutch/brake (not shown) which selectively allows for the power transmitting connection of the rotating flywheel assembly with crankshaft 40 is of a suitable type well-known in the art and is not shown for purposes of clarity.

The flywheel assembly includes a flywheel 42 having a central hub section 43. A bronze bushing 46, which is rigidly secured to hub section 43 within an axial hub bore, provides an inner cylindrical surface used with the hydrostatic bearings. Although shown having a one-piece construction, the flywheel may naturally be assembled from multiple parts bolted, welded, or otherwise fastened together. The rotation of flywheel 42 is powered by the drive mechanism which is attached to flywheel 42 by means of a belt (not shown).

In the shown embodiment, the flywheel assembly is rotatably mounted on a quill, generally designated 48, which is axially disposed on crankshaft 40. Quill 48 is shown having a one-piece construction including a sleeve portion 49 and a mounting collar 51. Spacers 53, 54 are for mounting of the clutch. Quill 48 is non-rotatably secured to the press frame, and more particularly in the shown embodiment to crown portion 12, with bolts (not shown) axially extending through quill collar 51.

Flywheel 42 rotates about quill 48 on bearings provided therebetween. The preferred bearing assembly between flywheel 42 and quill 48 is generally described in U.S. patent application Ser. No. 08/271,762, which is incorporated herein by reference. Multiple hydrostatic pad areas 56 formed on the cylindrical exterior surface of quill 48 are supplied with lubricating fluid such as oil through partially shown conduits 57 within quill 48 connected to external lines fed from orifices connected to a pressurized oil reservoir. Hydrostatic bearing pads 56 provide sufficient lubrication and load supporting characteristics to allow relative rotation between flywheel 42 and quill 48. Pads 56 further allow for axial movement of flywheel 42 and bushing 46 along quill 48, which is required in the designs described in co-pending U.S. patent application Ser. No. 08/537,996 which is incorporated herein by reference.

Figure 3:
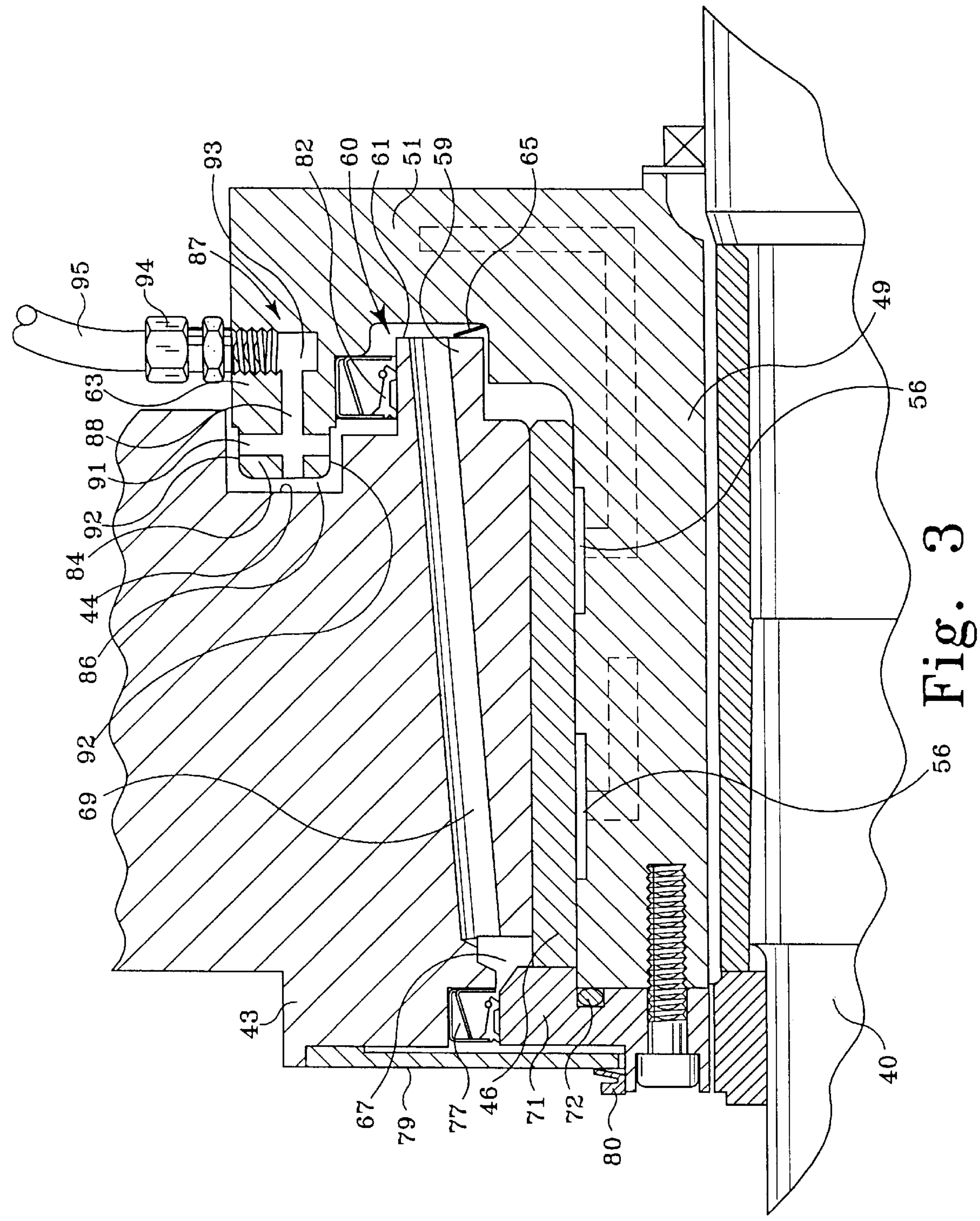
FIG. 3 is an enlarged view of a portion of FIG. 2 further illustrating the fluid control system.

With reference now to FIG. 3, which is an enlarged view of a portion of the press shown in FIG. 2, one embodiment of a fluid control system of the present invention is illustrated. When hydrostatic bearings are employed to reduce friction during flywheel rotation, appreciable amounts of lubricating fluid such as oil are constantly being supplied at a first pressure to pads 56, and the fluid displaced thereby which has served its lubricating function and experienced a pressure drop is eventually returned at a lower pressure to the press reservoir. The fluid control system disclosed below advantageously directs and contains this oil such that leakage is greatly minimized such that, for example, the function of the combination clutch/brake 38 is not compromised by oil reaching the clutch or brake linings. The fluid control system could also be employed to control lubricating or cooling fluid, for example used to lubricate or cool other conventional bearing configurations provided to the flywheel bearing or other working parts. An understanding of the fluid control system will be facilitated by the following explanation of its construction in reference to its operation.

Oil delivered to pad areas 56 flows axially inward and outward between quill sleeve 49 and bushing 46. Oil at the inward end of bushing 46 flows around the end portion 59 of flywheel hub 43, along annular surface 61 and radially outwardly into an annular, stepped fluid collection space 60. While in the shown embodiment quill collar 51 serves as the housing member which cooperates with flywheel 42 to form collection space 60, other housing members may alternatively be employed. For example, a disk shaped housing member separate from quill 48 and possibly directly connected to crown 12 may instead be employed within the scope of the invention.

The radial periphery of quill collar 51 forms a ring-shaped housing 63 in which are located the vacuum mechanisms of the shown embodiment. Although shown integrally formed with quill 48, vacuum housing 63 could be separately formed and attached to quill 48 or could be integrally formed with another portion of the non-rotating frame structure. As shown in FIG. 3, vacuum housing 63 includes a drain port 93 which is connected to a drain hose 95. Drain hose 95 drains oil accumulated within collection space 60 to a press sump (not shown) for recirculation. If desired, a wave spring 65 can be employed to bias flywheel 42 outward or to the left in the figures to reduce the axial play of flywheel 42 along quill 48.

Oil at the outward end of bushing 46 flows radially outwardly between bushing 46 and retainer ring 71 into an annular, fluid space 67. Radial grooves (not shown) provided in the rear face of retainer ring 71 permit oil flow despite the abutting contact of ring 71 and bushing 46. Oil within fluid space 67 then flows into multiple, angled fluid collection channels 69 extending through flywheel hub 43 at angular intervals. Oil within channels 69 empties into collection space 60 and then is drained through drain hose 95. Retainer ring 71 is bolted to quill sleeve 49 and is provided with O-ring seal 72 to prevent oil leakage therebetween.

An outward or front radial shaft seal 77 is mounted in a recess provided between flywheel hub 43 and retainer ring 71. Radial shaft seal 77 is of a well known construction and is arranged to provide a greater resistance to leakage in an outward a direction than an inward direction, and consequently seal 77, which rotates with flywheel 42, serves to prevent oil from leaking or escaping from fluid space 67. During slight axial movements of flywheel 42 that may occur during operation, the lip of shaft seal 77 rubs against the top surface of retainer ring 71 to maintain a tight seal therebetween. An annular dirt plate 79, which is fastened by bolts to flywheel hub 43, and a V-ring 80 circumferentially extending around retainer ring 71 prevent clutch dust and other contaminants from reaching seal 77 that would comprise the integrity of the seal.

At the inward side of flywheel 42, radial shaft seal 82 circumferentially extends around flywheel hub 43. Shaft seal 82 is constructed and arranged to prevent leakage of oil from collection space 60. Downstream along the potential oil leakage path past seal 82 is shown a vacuum mechanism, generally designated 87, mounted within a nose section 84 of vacuum housing 63.

Nose section 84 is provided around the entire 360° of vacuum housing 63 and axially projects into an annular recess 44 formed into the axial side of flywheel hub 43. An axial space 86 between the outward, annular face of nose section 84 and the radially aligned side of recess 44 accommodates axial movement of flywheel 42 during operation.

The shown vacuum mechanism 87 includes an axial drilling 88 with which cross bore 91 communicates. Cross bore 91 provides separate intake openings within vacuum grooves or undercuts 92 provided on the forward region of the outer radial periphery and inner radial periphery of nose section 84. Drilling 88 inwardly terminates at a tapped drain port 93 within vacuum housing 63, and fitting 94 screws into port 93 and is connected to hose 95 extending to a vacuum source (not shown).

During operation, any oil which leaks past seal 82 is forced radially outwardly by centrifugal force and flows axially into recess 44 where a vacuum is being drawn. During its axially flow into recess 44, the oil proceeds to be vacuumed away at the radially inner opening of bore 91. Any oil which manages to pass this opening will be vacuumed away when it reaches the radially outer opening of bore 91.

Although only a single vacuum mechanism 87 is shown in FIG. 3, multiple, similarly configured mechanisms are preferably provided at angular spaced intervals around vacuum housing 63 in order to ensure that an oil leak past seal 82 is kept under control. For example, four vacuum mechanisms may be provided which are spaced at even angular intervals, such as where each mechanism is spaced at a forty-five degree angle from horizontal.

A preferred configuration of the oil control system exists when the vacuum source provides one inch or more of mercury vacuum level, and when the radial clearances between the non-undercut, outer radial periphery of nose-section 84 and flywheel hub 43 is between about 0.004 to 0.006 inch, and preferably about 0.005 inch. The radial clearance between the non-undercut, inner radial periphery of nose-section 84 and flywheel hub 43 is preferably similarly dimensioned. Such an arrangement is believed to provide a uniform vacuum-induced air flow to drain port 93. As nose section 84 projects in an axial direction, the radial clearances remain constant during axial movements of the flywheel assembly relative to quill 48. As a result, axial play in the flywheel assembly does not compromise the uniformity of the vacuum flow removing oil which leaks past seal 82.

The vacuum source employed with vacuum mechanisms 87 to generate a vacuum-induced air flow therethrough and return the captured oil to the press sump is not material to the present invention and can be any of a variety of devices well known in the art. One suitable vacuum source is an ejector or jet-pump which routes the vacuumed oil and air to an oil demister filter from which oil is drained to the press oil reservoir. This source is generally described in U.S. patent application Ser. No. 08/409,910, which is incorporated herein by reference. The vacuum source is preferably kept on at all times, even when press 10 is not running, so as to constantly evacuate any oil which leaks past the seal area.

It will be appreciated that although in the embodiment of FIGS. 2 and 3 the vacuum housing 63 projects within a recess in the flywheel, in an alternate embodiment within the scope of the invention, the vacuum housing and the vacuum mechanism bores may be reconfigured to accommodate a projecting portion of the flywheel assembly.

Figure 4:
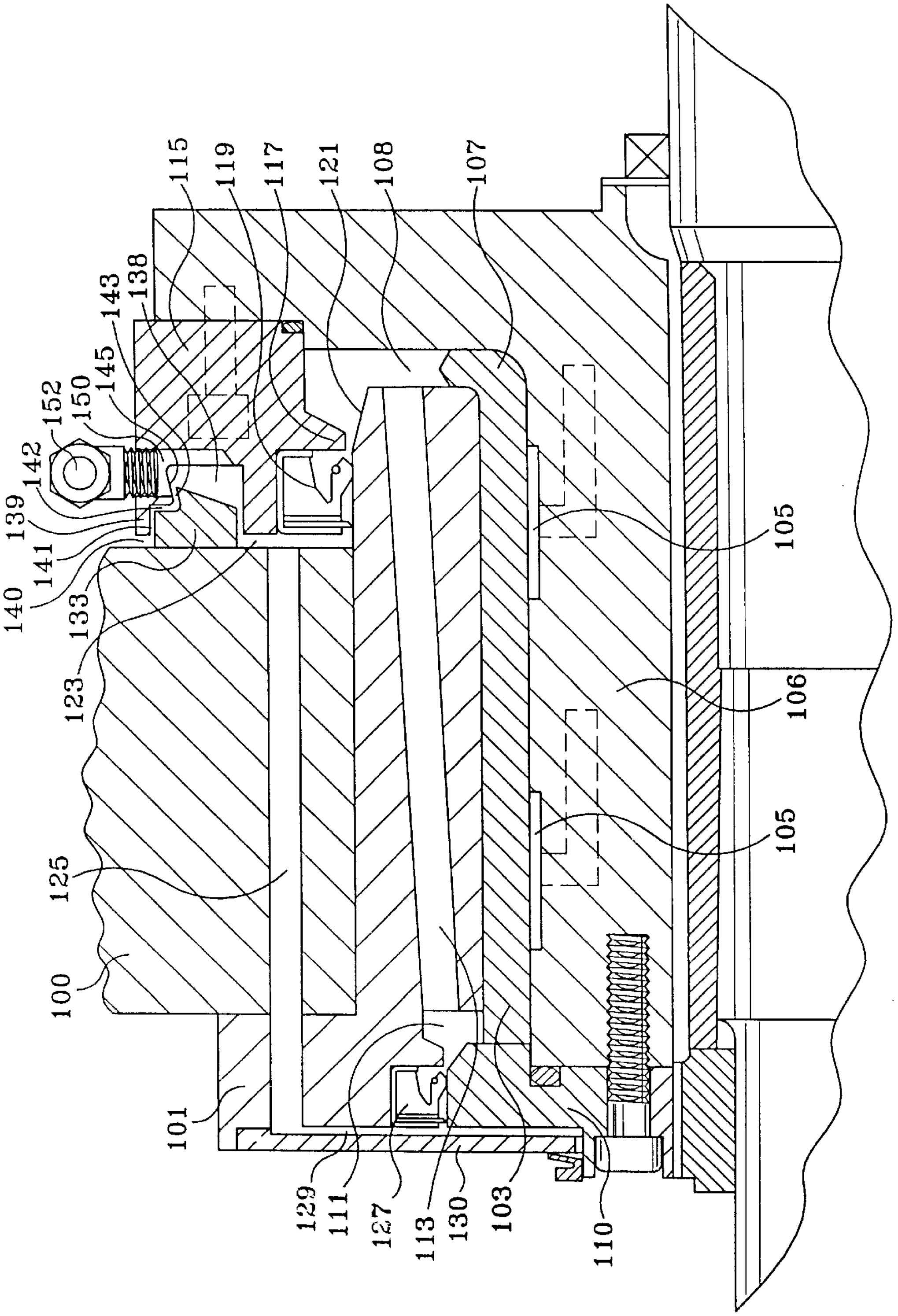
FIG. 4 is a sectional view similar to FIG. 3 of an alternate embodiment of the fluid control system and flywheel assembly of the present invention.

Referring now to FIG. 4, which is a view conceptually similar to FIG. 3, there is shown a portion of an alternate embodiment of a flywheel and fluid control system of the present invention. The flywheel includes a web 100 secured with bolts (not shown) to an annular shoulder of a flywheel hub 101. Bushing 103 is supported on an oil film supplied by hydrostatic pads 105 formed into quill 106.

Oil flowing off the inward end 107 of bushing 103 flows in a radial direction into annular fluid space 108. Oil at the outward end of bushing 103 first flows radially outwardly between bushing 103 and retainer ring 110 into an annular, fluid space 111, and then proceeds to flow through collection channels 113 into fluid space 108. The oil which collects within fluid space 108 is then gravity drained in a manner similar to that described with respect to FIGS. 2 and 3 through a drain hose (not shown).

Attached to quill 106 with bolts is a rotationally stationary, ring-shaped vacuum housing, generally designated 115. Vacuum housing 115 includes radial rib 117 that is used to form a seat for seal 119. Shaft seal 119 circumferentially extends around flywheel hub 101 and is designed to resist oil leakage from fluid space 108. To reduce the likelihood of oil ever reaching seal 119, the surfaces defining fluid space 108 are configured to act as a first oil obstruction mechanism. Specifically, flywheel hub 101 includes a lead-in bevel section 121, and the inward face of rib 117 is angled at a steeper angle relative to the horizontal or axial direction than bevel section 121 of the flywheel end portion and is spaced in close proximity thereto. During operation, oil moves along bevel section 121. Upon reaching the gap to which bevel section 121 and rib 117 converge, the oil, rather than passing through the gap, tends to adhere to the steeper bevel of rib 117 and migrate along rib 117 away from seal 119 back toward fluid space 108 from where the oil can be gravity drained.

Oil which does leak from fluid collection space 108 past seal 119 passes into an axial gap 123 between flywheel web 100 and vacuum housing 115. Oil within axial extending vacuum drain passages 125 also empties into axial gap 123. More particularly, front shaft seal 127 is designed to keep oil within annular space 111 from leaking past retainer ring 110. Any oil seeping past seal 127 passes by centrifugal force radially outward within clearance space 129 defined by annular dirt plate 130 and into passages 125 drilled through flywheel hub 101 and web 100. Space permitting, passages 125 may be radially outwardly angled such that centrifugal force aids the flow of oil from the front to back through passages 125. For the axial alignment shown, the flow of oil through passages 125 is achieved by the displacement of oil farther downstream or to the right within passage 125 by additional oil leaking past seal 127 and entering the upstream end of passage 125. Passages 125 are placed at angular intervals and between the bolts which connect hub 101 and web 100.

Oil within axial gap 123 flows radially outwardly therein until reaching a sharp-edged oil slinger, generally designated 133. Oil slinger 133 is annular and is concentrically secured to flywheel web 100 with bolts (not shown). To reduce concentricity problems associated with securing oil slinger 133 to the flywheel that can adversely impact the uniformity of the vacuum air flow, the oil slinger is preferably integrally formed with the flywheel.

Oil slinger 133 axially projects into an annular recess or groove 138 formed in vacuum housing 115. At selected locations around vacuum housing 115, such as four angularly spaced locations as with the vacuum mechanisms in the embodiment of FIGS. 2 and 3, vacuum drain ports 150 open into groove 138 and are connected with a vacuum source through a conduit connected to fitting 152. Groove 138 is complementarily shaped with slinger 133 such that a properly sized and shaped air duct between slinger 133 and the housing surface forming groove 138 is formed to allow air to be drawn into groove 138 past the radially outward lip of oil slinger 133 to provide the vacuum-induced air-flow effect.

For the oil slinger 133 shape shown, housing 115 includes a stepped lip 139 that forms an air duct consisting of axial gap 140, radial clearance 141, and endplay gap 142 that leads to a slinger/groove clearance 143. Endplay gap 142 is about 0.020 inch in axial length and accommodates flywheel endplay such that an open air flow path is continuously provided. In situations where the flywheel is to experience reciprocating axial movement, endplay gap 142 will be dimensioned to accommodate the movement with appropriate axial clearance space. Axial gap 140 is at least as large, and in the shown case larger, than endplay gap 142. Radial clearance 141, which is axially aligned and therefore unchanged by axial motion of the flywheel, is between about 0.004 to 0.006 inch, and preferably about 0.005 inch. Radial clearance 141 is unchanged by relative axial movement of the components and maintains the uniformity of the vacuum-induced air flow during such movement. Slinger/groove clearance 143, which is formed between the beveled, outer radius of oil slinger 133 and the beveled section 145 of groove 138, is sized such that the radial clearance between the pointed tip of oil slinger 133 and the radially inner extent of groove beveled section 145 is about 0.013 to allow slinger insertion during assembly.

During press operation, fluid within axial gap 123 flows radially outward toward oil slinger 133, passes axially inward along the 0.020 inch flow gap between the inner radius of slinger 133 and vacuum housing 115, and then passes outwardly along the angled, slinging edge of oil slinger 133. Oil slinger 133 tends to fling by centrifugal force the oil outward toward groove beveled section 145. The slanting of the beveled section 145, and the vacuum induced air flow through the air duct passing past the pointed tip of oil slinger 133, forces the oil inwardly within groove 138 such that it does not escape through the air duct. The oil within groove 138 is vacuumed into vacuum drain ports 150 from which the oil is removed to the press sump.

Figure 5:
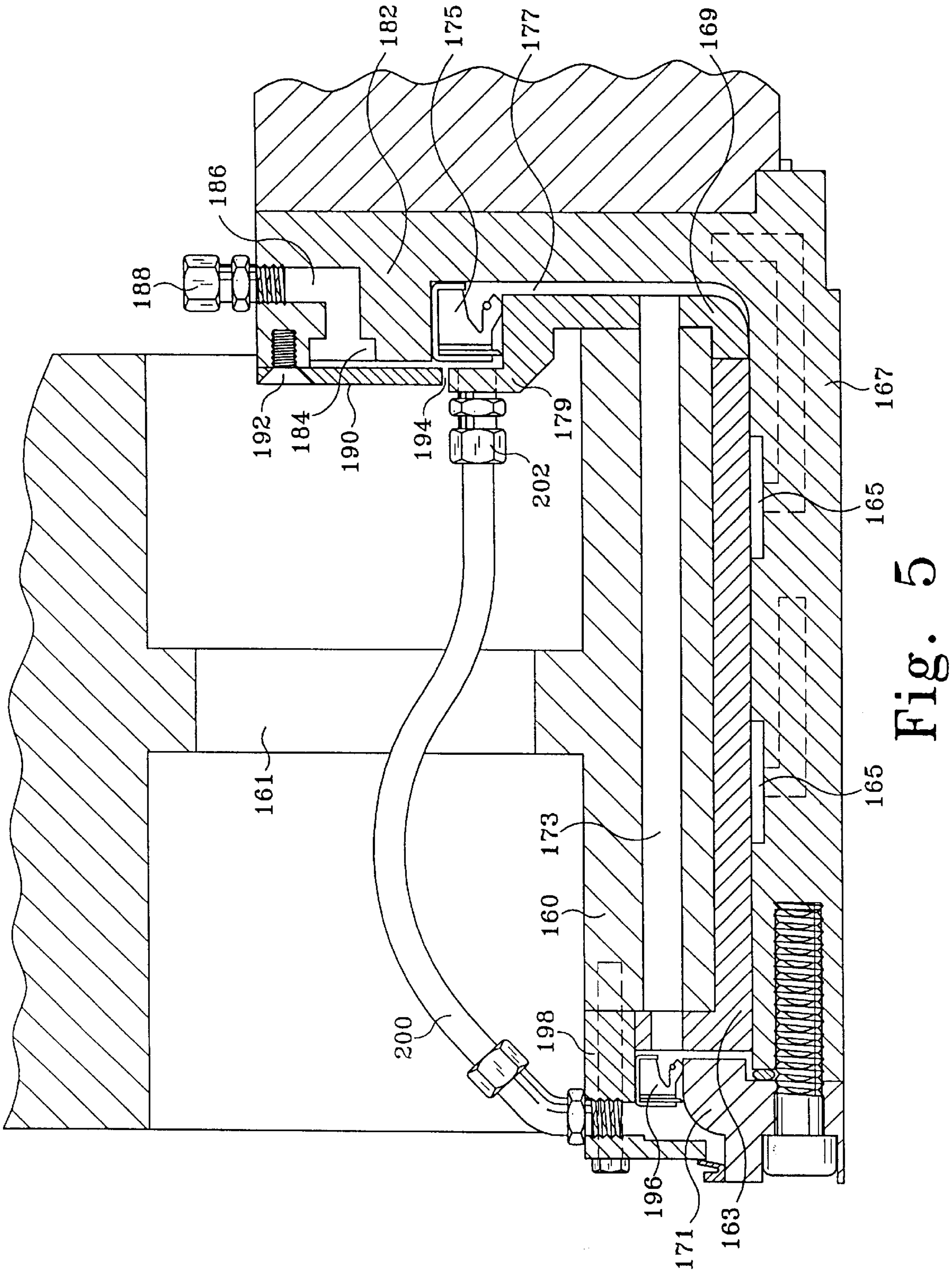
FIG. 5 is a sectional view similar to FIG. 4 of still another alternative embodiment of the present invention.

Referring now to FIG. 5, there is shown another fluid control system and flywheel assembly of the present invention. In this embodiment, the reduced profile flywheel hub 160 from which is radially inward web 161 is provided with bushing 163 supported on an oil film supplied by hydrostatic pads 165 formed into crown mounted quill 167. Rigidly attached to the inward end of hub 160 with bolts (not shown) is thrust retainer 169, and an O-ring (not shown) prevents leakage therebetween.

Oil flowing off the inward end of bushing 163 flows into a space 177 between the radially aligned end surface of thrust retainer 169 and quill 167. Oil at the outward end of bushing 163 flows radially outwardly between bushing 163 and retainer ring 171 and passes through angularly spaced collection channels 173 into collection space 177. At the bottom of the quill, a gravity fed drain hose (not shown) is connected to a drilling through quill 167 to access collection space 177 to drain the oil collected therein.

Circumferentially extending around thrust retainer 169 is a radial shaft seal 175 arranged to prevent leakage of the oil from collection space 177. Any oil which does leak past seal 175 passes radially upwardly between the forward side of seal 175 and the radially extending lip 179 of thrust retainer 169 and is vacuumed by the vacuum mechanism of the fluid control system of this embodiment.

The vacuum mechanism is shown including a housing 182 integrally formed with quill 167. A ring-shaped groove 184 in housing 182 is connected to multiple drain ports 186 with fittings 188 connected by conduits to a vacuum source, preferably in the same arrangement as described with respect to the alternate disclosed embodiments. Annular plate 190, which is fastened to housing 182 with screws 192, covers groove 184 and provides a radial clearance 194 which serves as an air duct through which an air flow for the vacuum can be drawn. Similar to the other embodiments, radial clearance 194 is about 0.005 inch.

Oil between seal 175 and thrust retainer lip 179 passes by centrifugal force toward groove 184. The vacuum induced air flow through radial clearance 194 frustrates leakage of oil therethrough, and the vacuum induced air flow aids in pulling the oil toward groove 184. Oil in groove 184 continues to be vacuumed through drain ports 186 and fitting 188 to the press sump for recirculation.

As shown in FIG. 5, oil leaking past front, radial shaft seal 196 passes by centrifugal force through a drain port provided in seal retainer 198 into hose 200. Although only one such drain port and hose are shown, it will be appreciated that multiple such assemblies may be positioned at angularly space intervals around retainer 198. At its downstream end, hose 200 is provided with a fitting 202 screwed into a tapped hole in thrust retainer lip 179 such that oil empties into the space between seal 175 and lip 179 for vacuum removal.

While this invention has been described as having multiple designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. In a mechanical press, in combination:

a shaft assembly including a rotatable component with an axis of rotation and at least one bearing, said rotatable component rotatably mounted to a support member by said at least one bearing;

a fluid control system for controlling fluid associated with said at least one bearing, said system comprising:

a fluid slinger mounted for rotation with said rotatable component;

a housing forming a clearance space with said shaft assembly, said clearance space arranged in flow communication with said at least one bearing to collect fluid therefrom;

a seal arranged to limit leakage of fluid from said clearance space;

a vacuum housing including at least one vacuum drain port connected to a vacuum source and arranged for removing fluid leaking past said seal, said rotatable component being rotatable relative to said vacuum housing, said vacuum housing further comprising a recess into which said fluid slinger projects and in communication with said at least one vacuum drain port, said fluid slinger positioned along a fluid leak path between said seal and said at least one vacuum drain port, whereby fluid leaking past said seal is slung into said recess by said fluid slinger; and an air duct structured and arranged to inlet a flow of air suitable to provide a vacuum induced air flow through said at least one vacuum drain port during vacuum operation sufficient to vacuum away fluid leaked past said seal.

2. The combination of claim 1 wherein said air duct comprises at least one duct section which is generally axially aligned, and wherein said air duct section comprises a radial clearance between said fluid slinger and said vacuum housing, whereby said vacuum induced air flow through said air duct remains substantially uniform during axial movement of said shaft assembly relative to said vacuum housing.

* * * * *

UNITED STATES PATENT AND TRADEMARK OFFICE
CERTIFICATE OF CORRECTION

PATENT NO. : 5,967,526
DATED : October 19, 1999
INVENTOR(S) : Richard J. Oen

It is certified that error appears in the above-identified patent and that said Letters Patent is hereby corrected as shown below:

On the title page item [73], "The Minster Machine" should read --The Minster Machine Company--

Signed and Sealed this

Twenty-sixth Day of September, 2000

Attest:

Q. TODD DICKINSON

*Attesting Officer*

*Director of Patents and Trademarks*